Feb. 19, 1929.

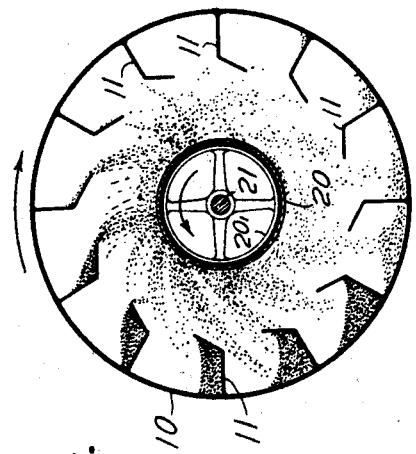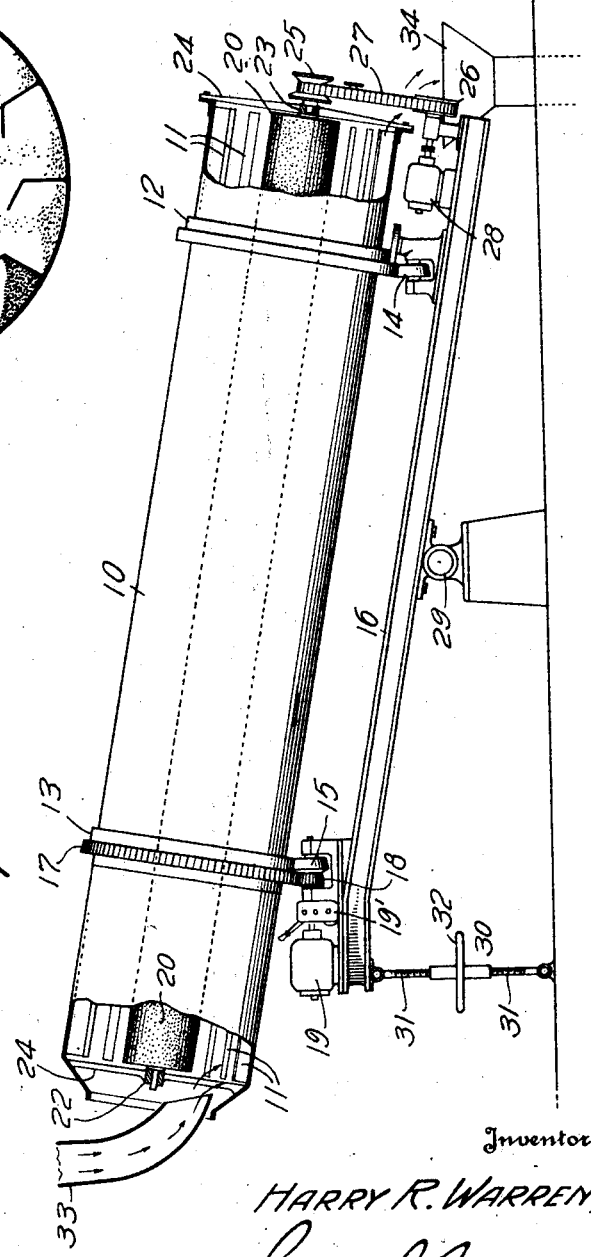

H. R. WARREN 1,703,048

SEED TREATING MACHINE

Original Filed Sept. 9, 1925   2 Sheets—Sheet 2

Inventor

HARRY R. WARREN,

By

Attorney

Patented Feb. 19, 1929.

1,703,048

UNITED STATES PATENT OFFICE.

HARRY R. WARREN, OF CHICAGO, ILLINOIS, ASSIGNOR, BY MESNE ASSIGNMENTS, TO WARREN-TEED SEED COMPANY, OF CHICAGO, ILLINOIS, A CORPORATION OF NEVADA.

SEED-TREATING MACHINE.

Application filed September 9, 1925, Serial No. 55,361. Renewed October 15, 1927.

This invention relates to the treatment of certain classes of seeds for the purpose of securing prompt and uniform germination of the seed. In certain classes of seeds, as for example clovers and other legumes, the seeds of the highest vitality are provided with an extremely hard shell or coating which offers great resistance to the penetration of moisture from without.

Other grades of the same seed are provided with a coat or shell which is less hard and offers less resistance to the penetration of moisture. The result of this is that when seed are planted they germinate in widely different periods of time varying, with some clovers for example, from a month to a year, and the best, most vigorous and highly vitalized seeds are those that take the longest to germinate because of the resistance to the penetration of moisture, which is an essential in the process of germination. This gives rise to a number of decidedly serious consequences. When seed is planted for a clover crop one year much of the seed will not germinate until the next succeeding year when a different crop is planted upon the land, and the clover coming up is, in fact, a pest to say nothing of the loss on the investment. Moreover, where irrigation is employed, lands planted with clover seed have to be repeatedly irrigated in order to bring about germination, whereas a single irrigation should be sufficient. These repeated irrigations or flooding of the land not only add greatly to the expense, but the later floods are injurious to the younger plants that have already come up.

The object of the present invention is to provide means for so treating these hard coated seeds that they will be more easily penetrated by moisture, thereby insuring prompt germination of the most vigorous and highly vitalized seeds, a more vigorous growth of plant and a resulting increase in crop. With this object in view, the present invention consists in means whereby the shell or hard outer coat of the seed is scarified or abraded so that the moisture essential to germination may readily penetrate the outer shell, which means preferably includes mechanism for repeatedly bringing the seed into scarifying contact with an abrading surface. More specifically stated, the invention consists of a suitable abrading surface or surfaces and a revolving drum or cylinder within which the seeds are placed, and means for repeatedly elevating the seeds above said surface and dropping them thereupon. Said abrading surface may be either a stationary or a moving surface, the essential being that the seed should be brought into abrading contact therewith. If desired, the exterior drum or cylinder may be the cylinder or drum of an ordinary drum drier, and means are provided for revolving the drum and for regulating the speed of the passage of the seed through the drum. Preferably, though not necessarily, this latter is accomplished by a variation of the angle of inclination of the drum, or the speed of revolution of the drum, or by variation of both the angle of inclination and speed of revolution.

The inventive idea involved is capable of receiving a variety of mechanical expressions, some of which for the purpose of illustration are shown in the accompanying drawings, but it is to be expressly understood that such drawings are for the purpose of illustration only and are not designed to define the limits of the invention, reference being had to the appended claims for this purpose.

In said drawings—

Fig. 1 is a side elevation partly broken away of a dryer drum or cylinder embodying this invention;

Fig. 2 is a transverse sectional view of Fig. 1;

Figure 3:
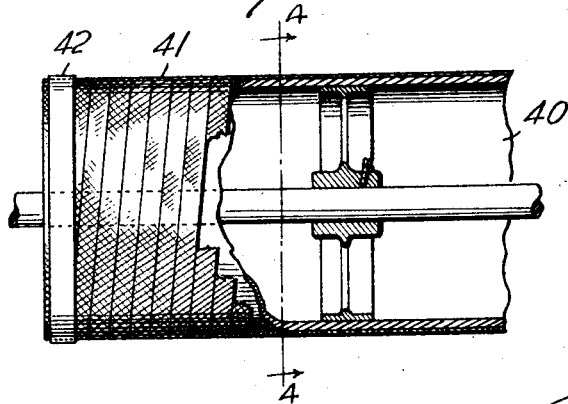
Fig. 3 is a broken side view of a form of scarifying means different from that shown in Fig. 1.

Referring to the drawings, in which like reference characters indicate like parts throughout the several views, and first referring to Figs. 1 and 2; 16 is a platform or support pivotally mounted on a transverse horizontal pivot 29 carried by any suitable support, as by a pedestal shown in the drawing. Mounted in suitable bearings near the respective ends of the platform 16 are two rollers 14 and 15. A drum or cylinder 10, which may be an ordinary dryer drum, is provided with two exterior annular flanges 12 and 13 which rest respectively on the rollers 14 and 15. The drum or dryer cylinder 10 is also provided with an exterior annular gear 17, which meshes with a gear 18 driven from any suitable source of power, as a motor 19, which motor is provided with any suitable speed regulating or adjusting device, as indicated at 19'. The interior surface of the drum or dryer cylinder 10 is provided with a series of interiorly projecting seed lifting vanes or ribs 11, the inner edges of said vanes being bent at an angle to the radii of the drum, whereby, as the drum revolves in the direction indicated by the arrow in Fig. 2, the seeds are carried upward by the vanes 11 and fall therefrom as the vanes approach the highest point. By this means the seeds are continuously lifted from the lower side of the drum or cylinder, carried to the upper portion thereof and dropped.

Within the drum or dryer cylinder 10 scarifying means are provided which may be either moving or stationary as desired. In the form shown in Figs. 1 and 2 said scarifying means consists of a cylinder 20, preferably of sheet metal coated with carborundum or other abrading material, which cylinder is mounted concentrically with the drum 10 in any suitable manner. As here shown, the cylinder 20 takes bearing in spiders 24 at the outer ends of the cylinder, the bearings being indicated at 22 and 23. If desired, suitable means may be employed for revolving the abrading cylinder 20. As here shown, such means are in the form of a suitable motor 28 mounted on the lower end of the platform 16 which serves through pulleys 25, 26 and the belt 27 to revolve the cylinder 20 in a direction reverse to that of the dryer drum or cylinder 10, as indicated by the arrows in Fig. 2.

The speed of movement of the seed through the device will depend upon the rapidity of revolution of the cylinder 10 and of the angle of inclination thereof. For the purpose of varying said angle of inclination, the rear end of the platform 16 is provided with a pair of reversely threaded screws 31, one of which extends downwardly from the rear end of the platform, while the other projects upwardly from the floor or other support, which screws are engaged by a reversely threaded nut 30 controlled by a hand wheel 32. Preferably, the pivot pin 29 is so located that the structure is nicely balanced thereon and very little power is required for turning the platform on the pivot. The seed is delivered at the upper end of the cylinder through a suitable conduit 33 and emerges at the lower end into any suitable receptacle, as at 34.

By referring to Fig. 2, the operation of the device will be readily understood. The seed is elevated by the vanes 11 and dropped upon the surface of the scarifying cylinder 20, which serves to abrade or scarify the seed coating, and this operation is repeated over and over during the passage of the seed through the cylinder 10.

Figure 4:
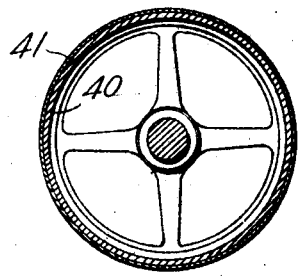
Fig. 4 is a transverse sectional view of Fig. 3.

Referring now to Figs. 3 and 4 the scarifying surface may, if desired, be in the form of a carborundum-coated ribbon 41, wound upon the exterior of the cylinder 40, suitable bands 42 being provided at the opposite ends to secure the ribbon in place.

Figure 5:
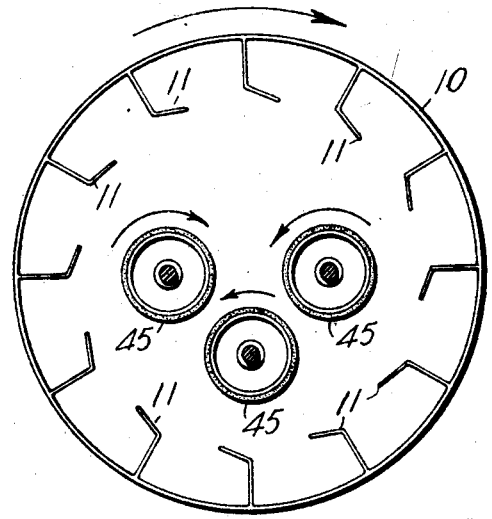
Fig. 5 is a diagrammatic end view of the dryer cylinder illustrating another embodiment of the invention.

Another embodiment of the inventive idea is disclosed in Fig. 5 in which a plurality of abrading cylinders 45, here shown as three in number, are mounted eccentrically within the cylinder 10. These several cylinders may be provided with any suitable means, not shown, for revolving the same, and preferably, as indicated by the arrows in Fig. 5, they do not all revolve in the same direction. It will be readily perceived that such a plurality of cylinders will serve to throw the seed from one cylinder to another and thus more rapidly scarify the seed than would the single cylinder shown in Fig. 1, and with some classes of seeds this action may be found desirable.

Figure 6:
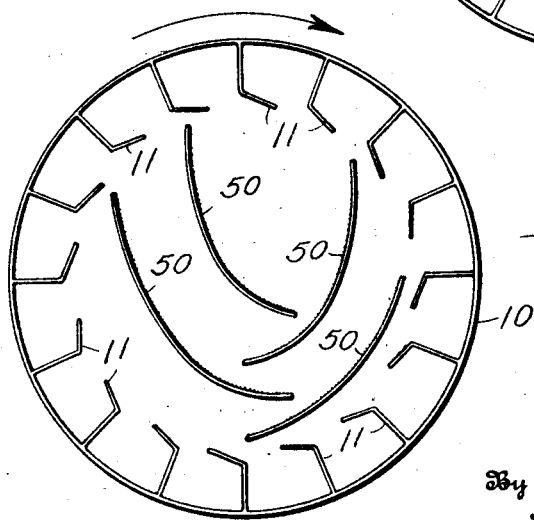
Fig. 6 is a diagrammatic end view of still another embodiment thereof.

Referring to Fig. 6, several stationary abrading surfaces 50, here shown as four in number, are provided, said surfaces being generally downwardly inclined to curve inwardly, and preferably they are arranged in a staggered relation so that the first surface delivers seed falling thereon to the second surface, which second in turn delivers to the third, and the third to the fourth surface. These several surfaces 50 are provided with abrading material, as carborundum for example, and the passage of the seed thereover serves to scarify the hard coating.

While the dryer drum or cylinder 10 is here shown as placed at an angle of inclination to the horizontal, because in the majority of cases such inclination is desirable, it may be found in some cases that a horizontal position of the cylinder would be most suitable. In such cases, the platform 10 can be adjusted so as to bring the cylinder to a horizontal position, or, if desired, the cylinder can be mounted on a permanent horizontal support.

It will be observed that by the use of the machine described the seeds are repeatedly raised above the abrading surface and dropped thereon, thereby assuring a repeated scarification of the seed in numerous places. This facilitates the penetration of moisture to effect quick germination.

What is claimed is:

1. In a machine of the character described, the combination of a revolving cylinder, means supporting the same at an angle to the horizontal, means within said cylinder for receiving the seed below the axis of said cylinder and elevating the same above said axis, and an abrading surface within and revolving in the opposite direction from said cylinder and upon which the seed are dropped from a point above the axis of the cylinder, and means delivering seed to the upper end of said cylinder.

2. In a machine of the character described, the combination of a revolving cylinder having interior longitudinally extending seed-receiving vanes, means supporting said cylinder at an angle to the horizontal, an abrading cylinder extending longitudinally within said first named cylinder, and means for revolving said abrading cylinder in the reverse direction from that of the exterior cylinder, and means delivering seed to the upper end of said cylinder.

3. In a machine of the character described, the combination of an exterior cylinder, means for regulating the inclination of said cylinder at an angle to the horizontal, a source of power for revolving said cylinder, means for regulating the speed of said source of power, and a revoluble abrading surface extending longitudinally through said inclined cylinder.

HARRY R. WARREN.